UNITED STATES PATENT OFFICE.

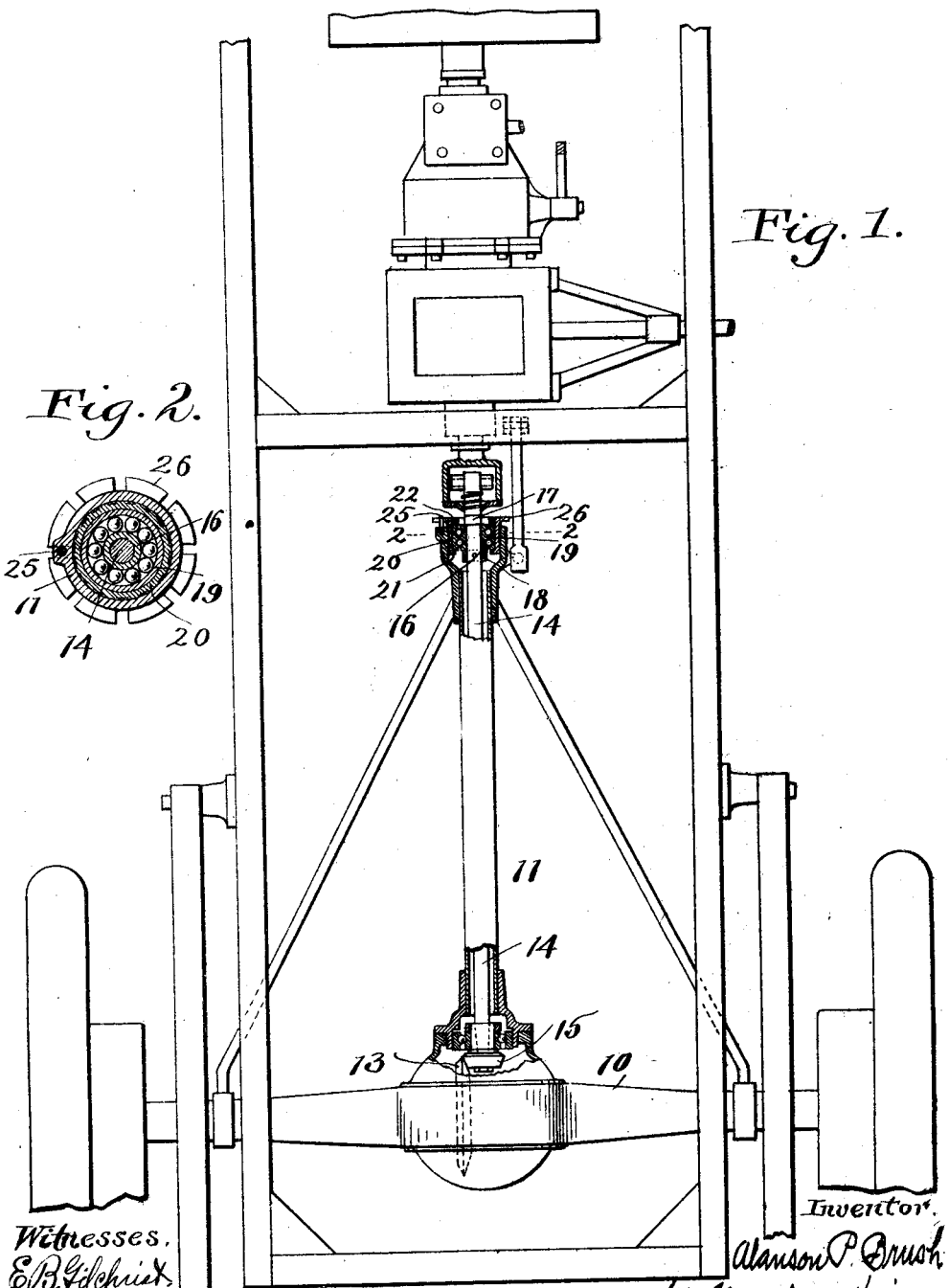

ALANSON P. BRUSH, OF FLINT, MICHIGAN.

AUTOMOBILE TRANSMISSION MECHANISM.

1,095,186.   Specification of Letters Patent.   Patented May 5, 19..

Application filed September 26, 1912. Serial No. 722,441.

*To all whom it may concern:*

Be it known that I, ALANSON P. BRUSH, a citizen of the United States, residing at Flint, in the county of Genesee and State of Michigan, have invented a certain new and useful Improvement in Automobile Transmission Mechanism, of which the following is a full, clear, and exact description.

This invention relates to certain novel means for rotatably supporting the propeller shaft of an automobile in such wise that it may be easily adjusted endwise and maintained in such adjusted position that the bevel pinion attached to its rear end will properly mesh with the driven bevel gear which is the part of the differential mechanism of the rear axle.

In the drawing Figure 1 is a sectional plan view of so much of the automobile driving mechanism as is necessary to disclose the present invention. Fig. 2 is a transverse sectional view through the bearing which supports the front end of the propeller shaft.

The rear axle casing 10 has rigidly connected with it a forwardly projecting tubular member 11. The casing contains the differential mechanism, and this differential mechanism includes a large beveled gear 13. The propeller shaft 14 extends through the tubular member 11, and has on its rear end a beveled driving pinion 15 which is intended to properly mesh with the driven bevel gear of the differential mechanism. To this extent the construction shown is well known.

The propeller shaft, near its rear end, is supported by this tubular casing member through the medium of anti-friction bearings which are *per se* of familiar form, that is to say, they include two rings placed one within the other having in their opposed cylindrical surfaces annular grooves which form raceways for the reception of anti-friction balls. The inner ring embraces and is fixed to the propeller shaft. The outer ring is nicely fitted in a cylindrical pocket or recess in the rear end of the tubular member 11; and this outer ring is capable of sufficient endwise movement in this pocket to permit the accomplishment of the desired result, as will result in the proper meshing of the two bevel gears 13, 15, as will be further explained. Near the front end of the propeller shaft 14 is another similar two-ring anti-friction bearing. The inner ring 16 embraces, and is fixed to the prop... shaft so as to be incapable of any r... endwise movement thereon. It prefer... lies between two collars 17, 18, which ... rigid with said shaft. The outer ring... is fitted into a sleeve 20. The rear end... this ring engages an inwardly turned flan... 21 on the inner end of said sleeve. A coll... 22 which is screwed into this sleeve agai... the front end of said ring serves to hold t... ring immovable in this sleeve. The sleev... 20 itself is screwed into the front end c... the tubular casing member. Obviously ... this sleeve is screwed into or out of this tu... bular casing member, the propeller sha... must move endwise, forward or backward, as the case may be. It therefore can be so positioned that the bevel driving pinion 15 on its rear end will properly mesh with the bevel driven gear 13 of the differential mechanism.

The rear bearing of the propeller shaft supports radial loads or strains only. The front bearing, as will be understood from the preceding description, supports both r... dial and longitudinal loads and strain... When the position of the propeller sha... has been properly brought about so that th... two gears referred to properly mesh, the... further turning of the sleeve within the tu... bular casing member is prevented by a... suitable locking means, of which many ar... well known. One suitable for the purp... is a screw finger 25 which screws into th... front end of the tubular casing membe... passing through holes or notches in the edg... of the outwardly turned flange 26 on the front end of the sleeve 20.

Having described my invention, I claim:

1. In automobile driving mechanism, the combination of a driven bevel gear, a driving pinion meshing therewith, a shaft carrying the driving pinion, a bearing adjacent to the pinion for carrying radial loads only, another bearing for the driving shaft near the front end thereof, which bearing is adapted to carry radial and longitudinal loads, and means wherewith to positively move the last mentioned bearing forward and backward and to immovably hold said bearing in any position into which it is so adjusted.

2. In automobile driving mechanism, the combination of a driven bevel gear, a driving shaft, a driving bevel pinion fixed to said shaft in mesh with said driven bevel gear, a bearing for the driving shaft adjacent to the pinion for carrying radial loads only, another bearing for the driving shaft near the front end thereof, means wherewith to positively move the last mentioned bearing forward or backward upon its support and to hold it in any adjusted position against longitudinal displacement.

3. In automobile driving mechanism, the combination of a driven bevel gear, a driving shaft, a driving bevel pinion fixed thereto in mesh with the driven bevel gear, and two bearings for said shaft, one located adjacent to the driving pinion, but in front of the same, which bearing is adapted to support radial loads only, and a second bearing located near the front end of the driving shaft, which bearing is adapted to support radial loads, and means for moving said bearing bodily and positively in both directions lengthwise of the shaft and for holding it in any adjusted position against longitudinal displacement, whereby said bearing will likewise support longitudinal loads upon said shaft.

4. In automobile mechanism, the combination with the rear axle casing and a forwardly projecting tubular member fixed thereto, the bevel driven gear of the differential mechanism rotatable within the rear axle casing, a driving shaft extending through the tubular casing member into the rear axle casing, a bevel pinion fixed to the rear end of said shaft in mesh with the bevel driven gear, two anti-friction bearings within which said driving shaft has no longitudinal movement, one of said bearings being slidably supported by and within the casing, and the other bearing being slidably supported by and within the front end of said tubular member, and means for positively moving the last mentioned bearing forward or backward within said tubular member and for immovably holding it in any position to which it is so adjusted.

5. In automobile mechanism, the combination with the rear axle casing, and a forwardly projecting tubular member fixed thereto, of the bevel driven gear of the differential mechanism rotatable within the rear axle casing, a driving shaft extending through the tubular casing member into the rear axle casing, a bevel pinion fixed to the rear end of said shaft in mesh with the bevel driven gear, two anti-friction bearings for said shaft, each comprising an inner ring which embraces and is fixed to the shaft, an outer ring, an anti-friction device interposed between said rings and adapted to prevent longitudinal movement of the rings relative to each other,—one of said bearings being located close to but in front of the bevel driving pinion within the rear axle casing and having its outer ring supported by and freely slidable within said rear axle casing,—the other bearing being located within and near the front end of the tubular casing member, and means by which the outer ring of the last mentioned bearing may be positively moved forward or backward within said tubular casing member and immovably held in any position to which it is so adjusted.

In testimony whereof, I hereunto affix my signature in the presence of two witnesses.

ALANSON P. BRUSH.

Witnesses:
E. L. THURSTON,
A. J. HUDSON.